US005760822A

United States Patent [19]
Coutinho

[11] Patent Number: 5,760,822
[45] Date of Patent: Jun. 2, 1998

[54] CENTRAL NODE CONVERTER FOR LOCAL NETWORK HAVING SINGLE COAXIAL CABLE

[75] Inventor: Roy S. Coutinho, Carmel, Ind.

[73] Assignee: Lucent Technologies Inc., Murray Hill, N.J.

[21] Appl. No.: 593,992

[22] Filed: Jan. 30, 1996

[51] Int. Cl.$^6$ .................... H04N 7/16; H04N 7/10
[52] U.S. Cl. .................... 348/121; 348/10; 348/6; 348/8; 348/11; 455/6.1; 455/6.2
[58] Field of Search .................... 348/8, 6, 10, 11, 348/7, 9, 12; 455/6.3, 3.1, 6.1, 6.2, 5.1, 4.2; 358/86; 386/26; 340/310.06, 310.01, 310.02; H04N 7/16, 7/10

[56] References Cited

U.S. PATENT DOCUMENTS

| | | | |
|---|---|---|---|
| 3,730,980 | 5/1973 | Kirk, Jr. | 455/6.2 |
| 4,079,415 | 3/1978 | Will | 455/6.2 |
| 4,360,828 | 11/1982 | Briggs, Jr. et al. | 455/5.1 |
| 5,418,559 | 5/1995 | Blahut | 348/10 |
| 5,512,963 | 4/1996 | Mankovitz | 455/6.2 |
| 5,574,964 | 11/1996 | Hamlin | 348/12 |
| 5,585,837 | 12/1996 | Nixon | 348/6 |

*Primary Examiner*—John K. Peng
*Assistant Examiner*—Linus H. Lo

[57] ABSTRACT

A method and device for use with a communication system having a single cable line containing externally transmitted data within a fixed frequency band for providing interaction between a transmitting terminal device and a receiving terminal device without disrupting the externally transmitted data. A modulator is provided for shifting a signal generated by the transmitting device to a frequency not receivable by the receiving device. A low pass filter passes the shifted signal to a block converter which converts the signal to a frequency outside of the fixed frequency band but which is receivable by the receiving device. An amplifier is provided for amplifying the converted signal and the externally transmitted data for receipt of the amplified signal by the receiving device.

13 Claims, 5 Drawing Sheets

CENTRAL NODE CONVERTER FOR LOCAL NETWORK HAVING SINGLE COAXIAL CABLE

BACKGROUND OF THE INVENTION

I. Field of the Invention

The present invention relates to a local or residential communication network which allows interaction between multiple receiving and transmitting terminal devices. More particularly, the present invention relates to a device or circuit for converting a residential single coaxial cable system into a network system for facilitating interaction between multiple receiving and transmitting terminal devices within a residence.

II. Description of the Related Art

Figure 1:
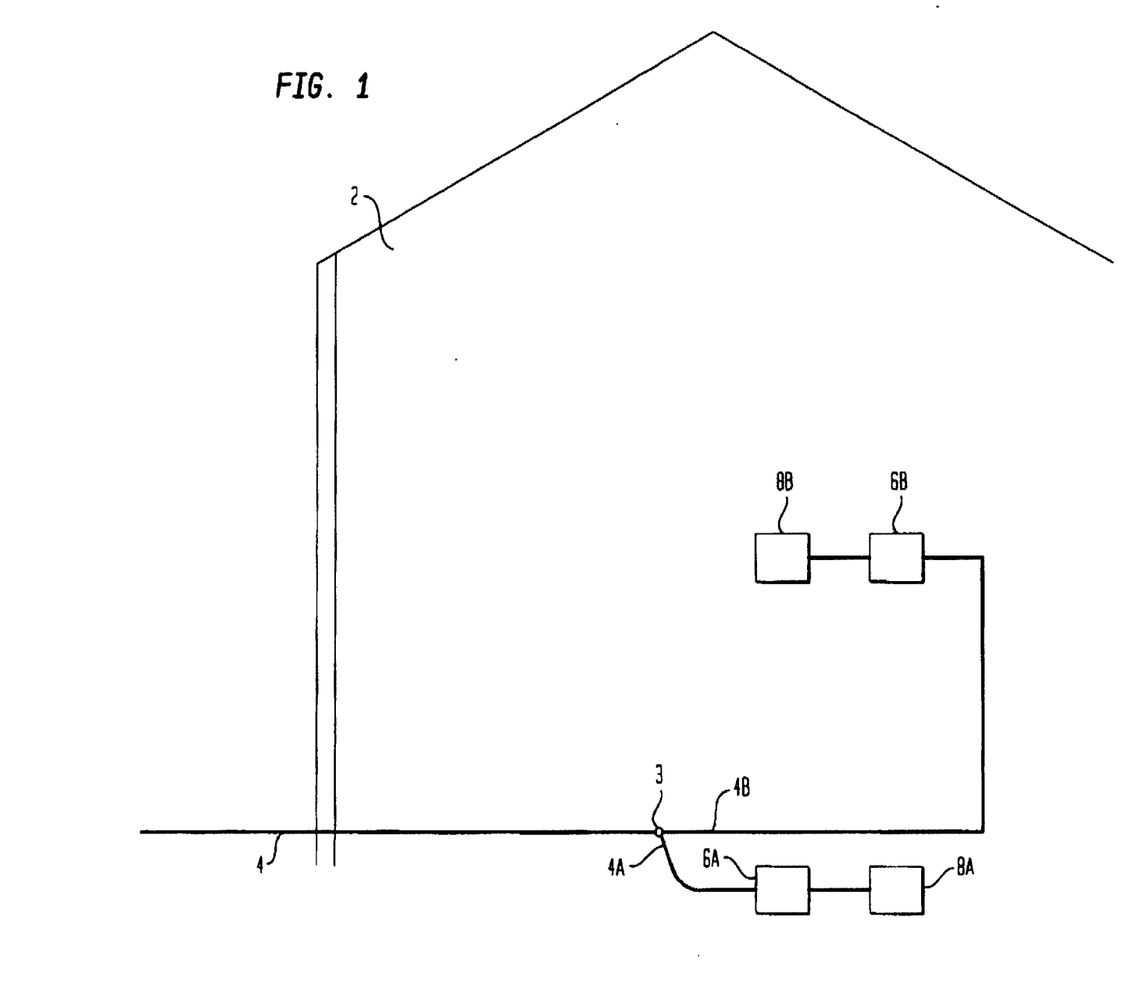
FIG. 1 is a schematic block diagram of a prior art single coaxial cable system.

Conventional cable transmission systems that provide cable television services to existing residences typically include a single coaxial cable connecting a cable television provider to each particular subscriber. Such a system is depicted in FIG. 1 which shows a residence or house 2 connected to a cable television provider by a main coaxial cable 4. The house 2, like many other houses, is wired to accommodate connection of various receiving and transmitting terminal devices to cable 4 by way of various connection terminals or jacks located throughout the residence. In such single cable systems a splitter 3 is conventionally used when multiple devices are to be connected to the cable. Splitter 3 divides main coaxial cable 4 into separate local lines 4A and 4B which provide cable services to different locations in the house, e.g. to bedrooms and living rooms. Each local line connects main cable 4 to terminal devices such as video cassette recorders (VCRs) 6 and televisions 8. Thus, for example, local line 4A provides cable service to devices contained in a living room such as VCR 6A and television 8A, whereas local line 4B provides cable service to devices contained in a bedroom such as VCR 6B and television 8B.

A drawback of such single cable systems is that aside from each receiving device receiving cable television signals, such as a variety of cable channels offered by the cable provider, each receiving device only interacts with and receives information from the transmitting device to which it is connected. Thus, television 8A positioned in the living room will, in addition to receiving various cable signals, only display a signal generated by VCR 6A and can not receive or display video information transmitted by VCR 8B contained in the bedroom. Likewise, television 8B cannot receive or display video information transmitted by VCR 6A. Thus, single coaxial cable systems do not allow interaction between the various terminal devices located throughout a residence which are connected to the common single coaxial cable 4.

Figure 2:
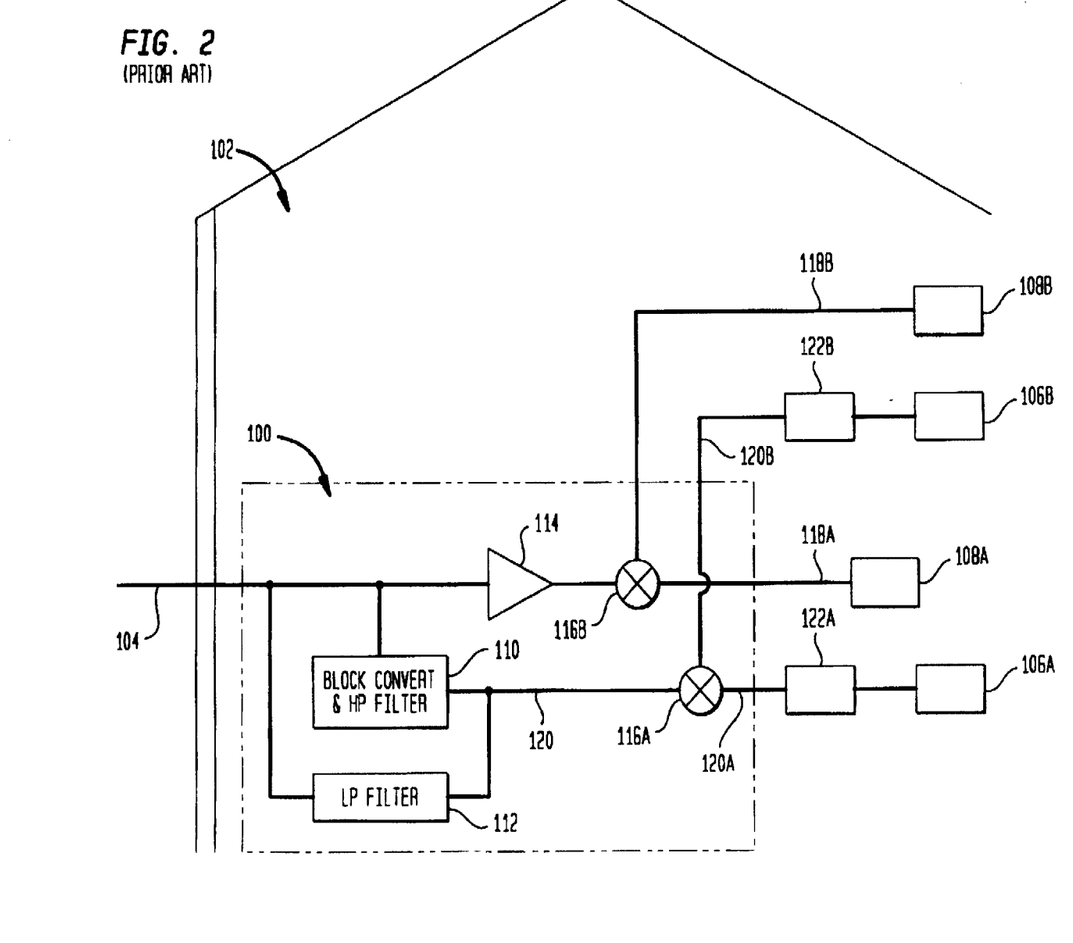
FIG. 2 is a block diagram of a known CEBus dual coaxial cable system.

Newer homes are wired with a consumer electronics bus (CEBus) comprising two separate coaxial cables having terminals or jacks in each room of the house. Such a system is depicted in FIG. 2 and allows for interaction between various terminal devices throughout the house regardless of the device location. As shown, such dual coaxial cable systems contain a main link such as a coaxial cable 104 which connects a cable provider to a subscriber or house 102 via a dual coaxial node converter 100. The node converter 100 connects transmitting and receiving terminal devices located in various rooms—such as VCR 106A and television 108A positioned in a living room and VCR 106B and television 108B positioned in a bedroom—with main cable 104. As shown, the transmitting devices (VCRs) 106 are connected to node converter 100 via local internal lines 120A and 120B, respectively, connected to internal line 120, whereas televisions 108A and 108B are connected to node converter 100 via local external lines 118A and 118B, respectively.

The frequency band comprising the cable television signals contained on main cable 104 is amplified by an amplifier 114 and the amplified signals which are represented by a plurality of cable channels such, for example, as channels 1–40, are provided to televisions 108 D through their respective local lines 118 which are connected to main cable 104 via a first splitter or divider 116B. Thus, both televisions receive the cable signal directly from main cable 104. The transmitting devices (VCRs) 106A and 106B, on the other hand, are not directly connected to the televisions but, instead, are connected to the local internal line 120 via local lines 120A and 120B, respectively, through a second splitter or divider 116A.

As is known in the art, most if not all commercially available VCRs are designed for transmission on one of two channels, typically channel 3 (60–68 MHz) or channel 4 (68–74 MHz). Dealing first with VCR 106A which is, by way of example, located in a living room in house 102, when this VCR is activated it transmits a data signal (video and/or audio) which is output to internal line 120. The signal is input to a block converter and high pass filter 110 as well as to a low pass filter 112. The block converter and high pass filter 110 removes the low frequency components from the VCR signal and heterodynes or shifts the remaining signal to a higher frequency, preferably outside of the available cable television band, whereupon the resulting shifted signal is provided to amplifier 114 for access by televisions 108A and 108B.

The frequency shift provided by block converter 110 is necessary to avoid interruption or interference with the available received cable channel signals. This is because a VCR generated signal having frequency components in the 60–70 MHz range will interfere with the cable television signals at that frequency. Thus, by shifting the VCR generated signal to a frequency beyond or outside of the available cable bandwidth, the VCR signal can be viewed by either or both televisions 108A and 108B without interfering with the available cable television signals. For example, if cable channels 1–40 are normally available, then generated VCR signal can be shifted by block converter and high pass filter 110 to a non-used channel, e.g. channel 73, so that the VCR signal can be viewed by selecting channel 73 on either or both televisions 108.

A similar situation occurs for a signal generated by VCR 106B; however, VCR 106B must be set to output its signals to a different channel in order to avoid interference with VCR 106A. In other words, if VCR 106A is switched to output its signals to channel 3, then VCR 106B must be switched to output to channel 4. Thus, after such shifting, the signal from VCR 106B can be viewed by either television by selecting channel 74. In addition, if a third VCR is used, a modulator 122 can be provided for shifting the VCR generated signal from either of the selected channels (3 or 4) to a still different channel before the signal is processed by block converter 110.

The low pass filter 112 is provided to allow a narrow control signal band which is present in the system to by-pass the block converter 110 so that the control signal is not shifted to a higher frequency. Low pass filter 112 thus filters out the high frequency VCR signal without interfering with the control signal which is usually in the range of 4–5 MHz.

The control signal may be used to ensure proper connection between the various terminal devices interfaced with node converter 100.

Figure 3:
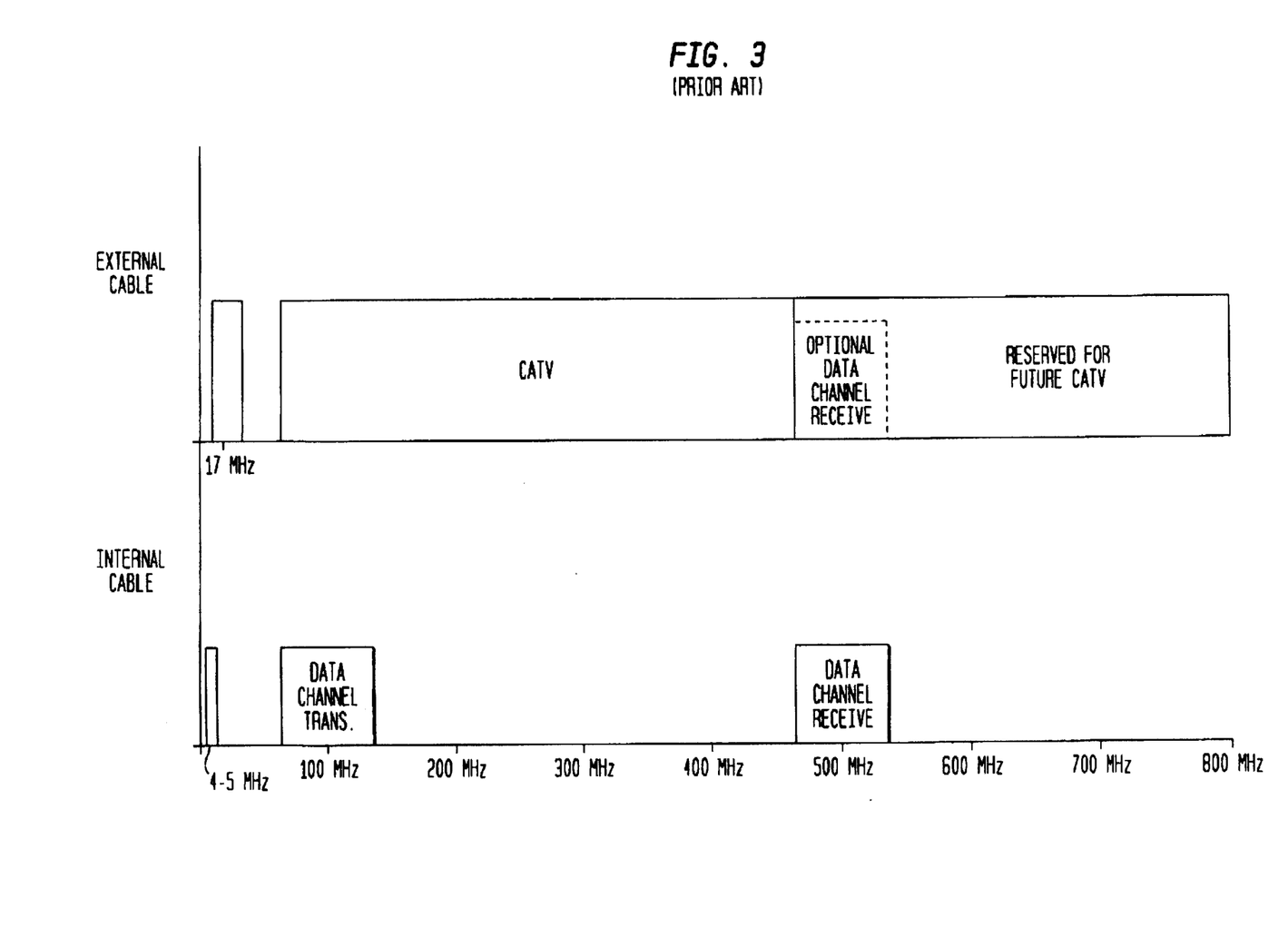
FIG. 3 is a frequency band diagram of the signals carried by the dual coaxial system of FIG. 2.

FIG. 3 depicts the frequency spectrum for the external cable and internal cable lines of the dual coaxial system depicted in FIG. 2. As there shown, the VCR-generated signal before shifting is labeled as "data channel transmission" and is centered at 100 MHz, whereas the shifted VCR-generated signal is labeled as "data channel receive" and is shifted to a center frequency of 500 MHz. As also shown, the data channel receive band is outside of the bandwidth for the available cable TV signal. The configuration depicted in FIG. 2 provides the data channel receive signal to the external cable line after block converter 110. Thus, in FIG. 3 the data channel receive is identified on the external cable frequency spectrum as "optional data channel receive" and is depicted as a broken-line region.

As will be appreciated, the above-described dual coaxial CEBus system is preferred over a single coaxial line system because it provides for networking of various terminal devices throughout a residence whereby, for example, any television can watch any VCR-generated signal without interfering with the available cable television signals. However, such a system is unavailable in many existing or older residences which have not been wired for CEBus technology. In such homes, interaction between various terminal devices can only be accomplished after costly and extensive rewiring to add an internal coaxial cable accessible throughout the residence.

SUMMARY OF THE INVENTION

Accordingly, it would be advantageous to provide a method and apparatus for converting a single coaxial cable system of the type present in many existing residences to a simulated dual coaxial cable system accommodating interaction between a plurality of terminal devices variously connected thereto.

The apparatus of the present invention provides a central node converter for connection to a link of a local communication network carrying frequency components of externally transmitted signals or data in a fixed frequency band defined between a minimum frequency value and a maximum frequency value. The communication network includes a receiving terminal device operable for receiving signals within a specified frequency range including the fixed frequency band, and a transmitting device for generating an internally transmitted signal having frequency components within the fixed frequency band. The inventive converter includes a first filter having an input and an output with the input connected to the link for removing, from the externally transmitted signals, frequency components below the minimum frequency value and for passing, to the output, frequency components within the fixed frequency band. An internal line is connected to the output of the first filter and carries the passed frequency components. A modulator is connected to the internal line and to the transmitting device for shifting the internally transmitted signal to a signal having frequency components outside of the specified range and for outputting the shifted signal on the internal line. A second filter having an input connected to the internal line and an output for passing the shifted internally transmitted signal to a block converter is also provided. The block converter is interposed between the output of the first filter and the output of the second filter and converts the already-shifted internally transmitted signal to a signal having frequency components outside of the fixed frequency band but within the specified range. An amplifier is connected to the outputs of the first and second filters and to the internal line for amplifying the filtered externally transmitted signals and the converted signal for forming an amplified signal which is provided to the receiving terminal device.

In the preferred apparatus embodiment, a second modulator is employed to modulate a signal generated by a second transmitting device so that two separate internally generated signals are available for reception by the receiving device without either signal interfering with reception of the externally transmitted signals or data.

The method of the present invention is directed to a technique for providing communication between a receiving terminal device and a transmitting terminal device, both devices being connected to a link of a communication network for providing a location with externally transmitted signals having frequency components contained in a fixed frequency band having a minimum frequency value and a maximum frequency value. The receiving terminal device is capable of receiving signals within a specified frequency range including frequency components within the fixed frequency band, and the transmitting terminal device is capable of generating an internally transmitted signal having frequency components within the fixed frequency band. The method includes the step of filtering the externally transmitted signals to remove frequency components below the minimum frequency value and to pass frequency components above the minimum frequency value. The internally transmitted signal generated by the transmitting device is modulated or shifted to a frequency outside of the specified range and the shifted signal is filtered to remove frequencies within the fixed frequency band and to pass the modulated internally transmitted signal. The filtered signal is then converted to a signal outside of the fixed frequency band but within the specified range, and the resulting signal is amplified for receipt by the receiving terminal device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views.

DETAILED DESCRIPTION OF THE PREFERRED EMBODIMENTS

Figure 4:
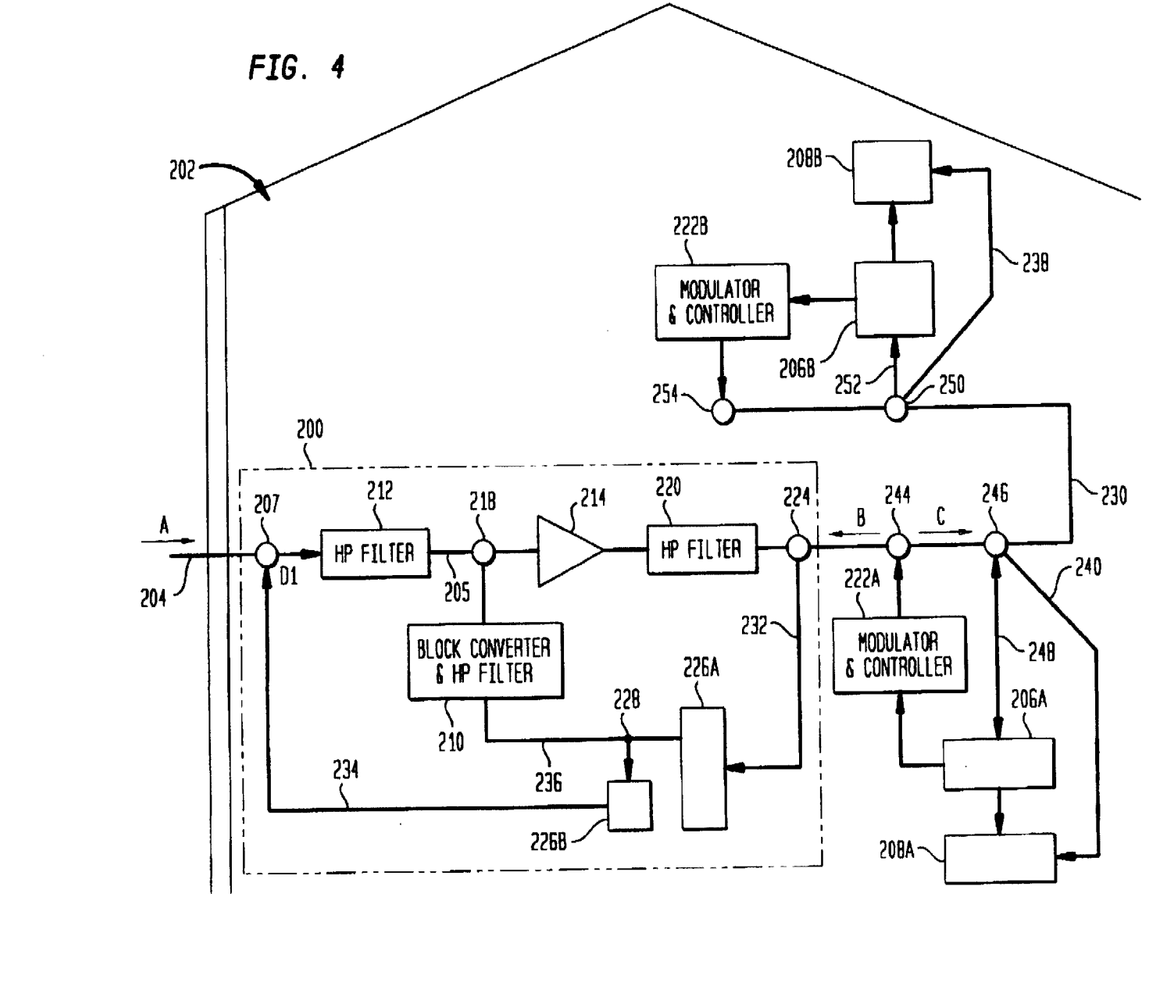
FIG. 4 is a single coaxial cable system employing a converter in accordance with the present invention.

With reference now to FIG. 4, a block representation of a modified single coaxial cable system constructed in accordance with the present invention is there depicted. As shown, a link which may be in the form of a main coaxial cable 204 connects a cable provider to a particular cable subscriber such as a house or residence 202 via a residence cable 205. Main link 204 provides various data contained in a fixed frequency band such, for example, as cable television information for receipt by receiving devices 208A and 208B. The receiving devices 208 may be located in different rooms in the house, i.e. the living room and a bedroom, respectively, and are capable of receiving signals within a predetermined or specified frequency range including the fixed frequency band. Receiving terminal devices 208A and 208B (such as televisions) are indirectly connected to main link 204 by a central node converter 200 via a local line 240 for device 208A and a local line 238 for device 208B. Transmitting terminal devices such as VCRs 206 generate internally transmitted signals within the fixed frequency band and are connected to a main internal signal line 230 via lines 248 and 252 which are coupled thereto via splitters 246 and 250, respectively. The output of each VCR 206 is connected to a corresponding modulator and controller 222 interfaced with main internal signal line 230. As more fully described below, the central node converter 200 allows interaction between the various terminal devices 206A, 206B, 208A and 208B.

In addition to the cable TV information—which is typically contained in the 50 to 450 MHz frequency range—other signals carried on the residence cable 205 include a control channel (commonly in the 4 to 5 MHz range), an upstream return path for data transmitted from the house 202 to the cable supplier when such feature is available, i.e. upstream signals as, for example, data generated from a set-top-box (not shown) for requesting special programming (in the range of 6 to 11 MHz), a data channel transmission signal comprised of video signals generated by the various transmitting terminal devices 206A and 206B (in the range of 12 to 40 MHz), and a buffer range or guard band to prevent overlap or interference with the cable signals (in the range of 40 to 50 MHz). The incoming signal from main link 204 enters central node converter 200 via cable 205 and is directed, via a directional coupler 207, to a high pass filter 212 for removing frequency components other than the cable television frequency components, i.e. frequency components below 50 MHz. The filtered signal is then provided to an adder 218 which, as more fully described below, adds heterodyned VCR signals thereto, and the resulting signal is amplified by amplifier 214. The output of amplifier 214 is input to a high pass filter 220 which blocks low frequency signals below 50 MHz to prevent oscillation of the circuit, and the resulting signal is divided by splitter 246 and provided to main signal line 230 for receipt by television 208B and to local signal line 240 for receipt by television 208A.

A substantial portion of the signal bandwidth of main internal signal line 230 contains the cable television or data signals transmitted by the cable provider to the subscriber. Thus, in the case of cable television service for example, the portion of the signal in the frequency range of 50–450 MHz may comprise the cable television service corresponding to cable channels 1–40.

As explained above, the control node converter 200 provides for interaction between a plurality of transmitting and receiving terminal devices that are connected to the main line 204. This is accomplished by heterodyning or frequency shifting the transmission signals generated by the transmitting terminal devices 206A and 206B to a center frequency outside of the cable television bandwidth, i.e. to a center frequency greater than 450 MHz. By modulating each VCR 206 or other transmitting device with a modulator and controller 222 so that the generated signal does not occupy frequency components in the available cable television bandwidth, interference with available cable stations transmitted by the cable provider is avoided.

With reference to transmitting device 206A, for example, and in the case of a VCR, a generated transmission signal is input to the modulator and controller 222A which modulates or shifts the signal to a lower center frequency. The shifted signal is then fed to signal line 230 via directional coupler 244. Modulator and controller 222A also generates a control signal which communicates with other terminal devices on signal line 230, in a manner more fully described below.

The modulated signal is directed both upstream in the direction of arrow B to an internal signal line 232 and downstream in the direction of arrow C to terminal devices 206B and 208B via signal line 230. As described above, since conventional VCRs are selectively operable in only one of two center frequencies or channels which overlap with the channels provided by a cable television company or provider, in order to avoid interference the transmitted signal produced by VCR 206 is modulated by modulator 222A to a center frequency which is not directly tunable by the televisions 208A and 208B. For example, if VCR 206A transmits a signal on channel 3 (in the band between 60–68 MHz), modulator 222A heterodyne shifts the signal to a frequency below the minimum frequency tunable by the receiving devices, i.e. below 50 MHz and preferably in the range of 12–40 MHz. Thus, although a portion of the shifted signal is provided on signal line 230 in the direction of arrow C, this signal does not affect the downstream receiving terminal devices because it is at a frequency below the reception capabilities of such devices.

The portion of the modulated video signal provided in the direction of arrow B is divided by a coupler 224. A portion of that divided signal is filtered by high pass filter 220 to prevent drift into the output terminal of amplifier 214, and the remainder is directed to internal signal line 232 for processing by a pair of staggered low pass filters 226A and 226B. Filter 226A is a low pass filter which blocks frequencies above the modulated transmitted frequencies generated by the transmitting devices 206A and 206B. Thus, and as stated above, since the transmitted signals are in the range of 12–40 MHz, low pass filter 226A will pass these frequencies and block signals having frequencies above approximately 40 MHz.

The resulting low frequency components are then output by filter 226A on a transmit line 236 and divided by a splitter 228 between a low pass filter 226B and a block converter/high pass filter 210. Filter 226B passes frequencies below the transmitted signal frequency components, i.e. frequencies below 12 MHz which, as explained above, contain the upstream signals when such features are available, and these frequency components are output on a line 234 which is then provided to residence cable 205 and main link 204 via directional coupler 207 for upstream output in the opposite direction of arrow A to the cable service supplier. The upstream signal may contain data generated by the subscriber for ordering or selecting optional premium programming from the service provider.

As also noted above, transmit line 236 contains the transmitted video signals generated by transmitting devices 206A and 206B as well as control signals and upstream signals generated by modulators 222. This signal is input to a block converter and high pass filter 210 which filters out the control and upstream signals to separate and retain the transmit signal components in the range of 12 to 40 MHz. This filtered signal is then heterodyned or shifted by the block converter to a higher frequency outside of the available cable television frequency spectrum whereupon it is mixed with the incoming cable television signal via adder 218, amplified by an amplifier 214 and then provided (through high pass filter 220) to signal line 230 for reception by the various receiving terminal devices.

For example, in a cable system providing to a subscriber 40 channels (channels 1–40) of content, a signal generated by transmitting device 206A will be modulated or shifted by modulator 222A to a frequency below the reception capabilities of the receiving devices 208, i.e. below 40 MHz. This initially shifted signal is then shifted to a higher frequency by block converter 210 whereby the signal can be received and viewed by receiving terminal devices 208A and 208B by selecting the new channel, e.g. channel 73, to which the signal has been shifted by block converter 210. Similarly, a signal generated by transmitting device 206B will be shifted by modulator 222B to a low frequency different than the frequency produced by modulator 222A and this signal will then likewise be shifted by block converter 210 to a frequency outside of the normally-employed cable spectrum, whereupon the shifted signal can be retrieved by receiving devices 208A and 208B by tuning the receiving device to the appropriate shifted channel, e.g. channel 74.

As stated above, in addition to modulating or shifting each transmitted signal generated by the transmitting devices 206, modulators/controllers 222 also generate a control signal having a low frequency, preferably below 11 MHz. The control signal is used for communication with the transmitting devices connected to main signal line 230 to ensure that the down-shifted signals do not overlap each other. For example, if modulator 222A shifts the signal generated by transmitting device 206A to a center frequency of 35 MHz, modulator/controller 222A will generate a control signal which is received by modulator/controller 222B to inform modulator 222B to not use frequencies at or near 30 MHz as such frequencies will interfere with the modulated signal from transmitting unit 206A.

Figure 5:
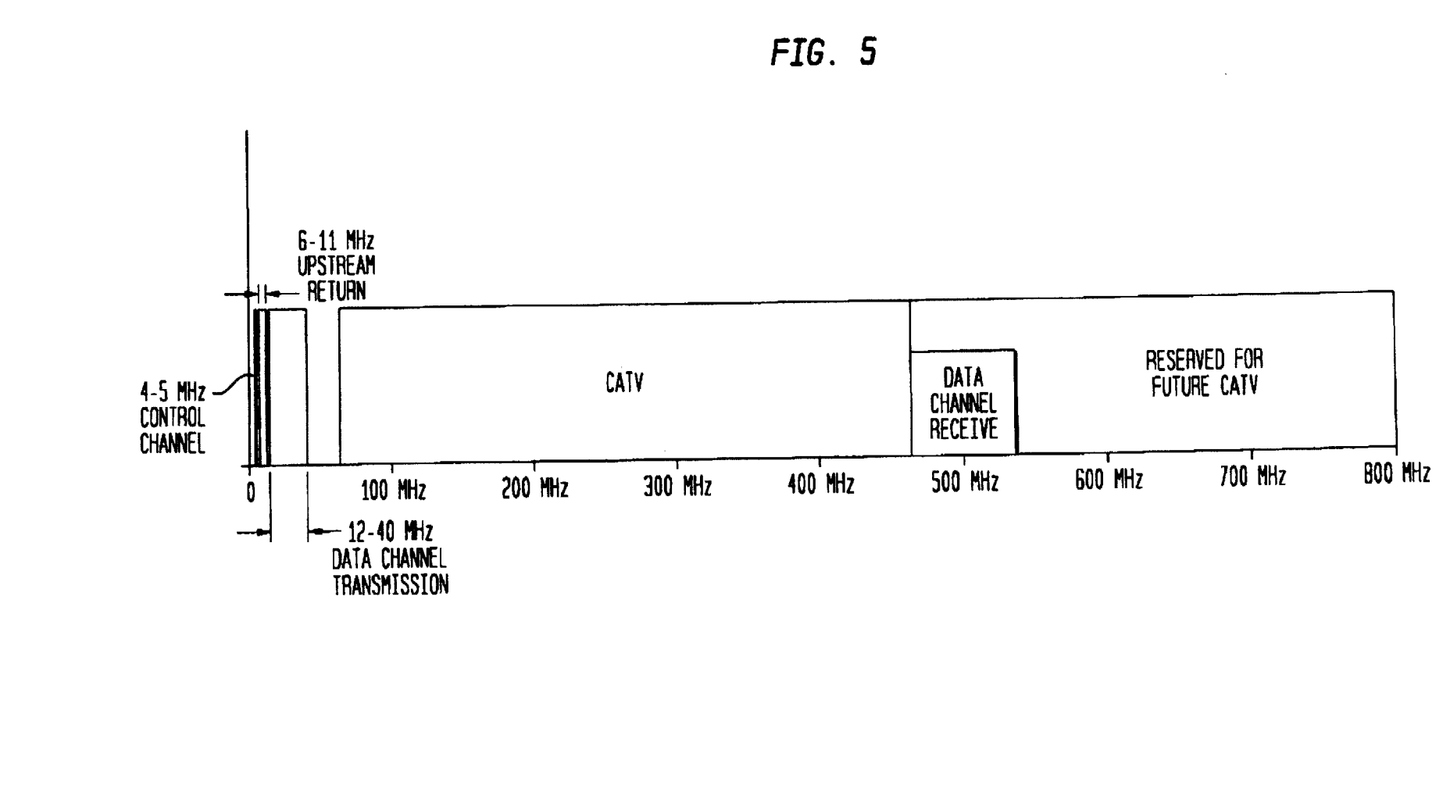
FIG. 5 is a frequency band diagram for the signals carried by the system of FIG. 4.

FIG. 5 depicts a frequency spectrum for the modified single coaxial system of FIG. 4. As there shown, and in contrast to the frequency spectrum of FIG. 3, the frequency components of the various signals are now carried on a single cable. The control channel is located at 4–5 MHz, the optional upstream return signal is at 6–11 MHz, and the transmission signal is shown shifted from the 12–40 MHz band to the range of 450–550 MHz which is beyond the highest frequency of the available cable signal, i.e. 450 MHz. Accordingly, and as should by now be appreciated, the central node converter 200 in conjunction with the modulators/controllers 222 provide dual coaxial cable functionality in a single coaxial cable system without the necessity of re-wiring the single coaxial cable system to add or include a local internal coaxial line for connection to the various transmitting devices. Interaction and communication between the various terminal devices is thus accommodated without interference with existing cable service.

It should also be understood that although the system of FIG. 4 is hereinabove described in connection with cable television service, the system can easily be used or implemented with network communication services and devices whereby a main cable provides such services to a residence or other location. In such applications, the television and VCR terminal devices of the depicted arrangements may be replaced with communication terminal devices such as video phones, facsimile machines, computers, etc. It will also be recognized by those of ordinary skill in the art that the particular frequency ranges described above and indicated in FIG. 5 are for exemplary purposes only and that other frequency ranges may be assigned or selected without departing from the spirit and intended scope of the invention; i.e. it is simply desired that the selected ranges not overlap or interfere with the signals transmitted over the main link 204 by the cable signal supplies or source. Furthermore, it should be readily understood that although link 204 is depicted as a cable line, link 204 may, alternatively, be a satellite dish or other receiving and transmitting device which receives and transmits aerial signals to and from a subscriber or residence.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A central node converter for connection to a link of a residential communication network carrying frequency components of externally transmitted signals in a fixed frequency band defined between a minimum frequency value and a maximum frequency value, the communication network including a receiving terminal device operable for receiving signals within a specified frequency range including the fixed frequency band and a transmitting device for generating an internally transmitted signal having frequency components within the fixed frequency band, said converter comprising:

a first filter having an input and an output, said input being connected to the link for receiving and removing, from the externally transmitted signals carried on the link, frequency components below the minimum frequency value and for passing, to said first filter output, frequency components within the fixed frequency band;

an internal line connected to said first filter output for carrying the passed frequency components;

a modulator connected to the transmitting device for receiving and shifting the internally transmitted signal to a shifted signal having frequency components outside of the specified range and connected to said internal line for outputting said shifted signal on said internal line;

a second filter having an input connected to said internal line for receiving and filtering the shifted signal, and an output for passing said filtered shifted internally transmitted signal;

a block converter connected between said first filter output and said second filter output for converting said filtered shifted internally transmitted signal to a reshifted signal having frequency components outside of the fixed frequency band but within the specified frequency range;

an amplifier connected to the first filter output and to said block converter and said internal line for amplifying the passed frequency components of said filtered externally transmitted signals and said reshifted signal to define and output to said internal line an amplified signal; and means for connecting the receiving terminal device to said internal line for receiving said amplified signal.

2. The converter of claim 1, further comprising a third filter connected to said second filter output for passing a pre-select frequency band signal from said shifted internally transmitted signal to said link for transmission upstream on said link, said pre-select frequency band signal comprising a subscriber generated data signal.

3. The converter of claim 1, further comprising a high pass filter connected to said amplifier for filtering from said amplified signal frequency components below said minimum frequency value.

4. The converter of claim 1, wherein the communication network further includes a second transmitting device for generating a second internally transmitted signal having frequency components within the fixed frequency band, said converter further comprising:

a second modulator connected to said internal line and to the second transmitting device for shifting the second internally transmitted signal to a second shifted signal having frequency components outside of the specified range and for outputting said second shifted signal on said internal line so that said second filter passes said second shifted internally transmitted signal, said block converter converts said second internally transmitted signal to a second reshifted signal having frequency components outside of said fixed frequency band but within said specified range, and said amplifier amplifies said second reshifted signal.

5. The converter of claim 4, wherein said second modulator generates a control signal which is output on said internal line for receipt by said first modulator to inform said first modulator of the frequency components of said second reshifted internally transmitted signal.

6. The converter of claim 5, wherein said frequency components of said first and second reshifted internally transmitted signals are lower than the minimum frequency value of the fixed frequency band.

7. The converter of claim 2, further comprising a high pass filter connected to said amplifier for filtering from said amplified signal frequency components below said minimum frequency value.

8. The converter of claim 7, wherein the communication network further includes a second transmitting device for generating a second internally transmitted signal having frequency components within the fixed frequency band, said converter further comprising:

a second modulator connected to said internal line and to the second transmitting device for shifting the second internally transmitted signal to a second shifted signal having frequency components outside of the specified range and for outputting said second shifted signal on said internal line so that said second filter passes said second shifted internally transmitted signal, said block converter converts said second internally transmitted signal to a second signal having frequency components outside of said fixed frequency band but within said specified range, and said amplifier amplifies said second reshifted signal.

9. The converter of claim 8, wherein said second modulator generates a control signal which is output on said internal line for receipt by said first modulator to inform said first modulator of the frequency components of said second reshifted internally transmitted signal.

10. The converter of claim 9, wherein said frequency components of said first and second reshifted internally transmitted signals are lower than the minimum frequency value of the fixed frequency band.

11. A method for providing communication between a receiving terminal device and a transmitting terminal device, both devices being connected to a link of a communication network for providing a location with externally transmitted signals carried on the link comprising frequency components in a fixed frequency band defined between a minimum frequency value and a maximum frequency value, the receiving terminal device being operable for receiving signals within a specified frequency range including frequency components within the fixed frequency band, the transmitting terminal device being operable for generating an internally transmitted signal having frequency components within the fixed frequency band, said method comprising the steps of:

a) filtering the externally transmitted signals carried on the link to remove frequency components below the minimum frequency value and to pass frequency components above the minimum frequency value;

b) modulating the internally transmitted signal to a frequency outside of the specified range;

c) filtering said modulated internally transmitted signal to remove frequencies within the fixed frequency band and to pass said modulated internally transmitted signal;

d) converting said filtered modulated internally transmitted signal to a signal outside of the fixed frequency band but within the specified range; and e) amplifying the converted signal and the externally transmitted signals for receipt by the receiving terminal device.

12. The method of claim 11, wherein the communication network includes a second transmitting device for generating a second internally transmitted signal having frequency components within the fixed frequency band, said modulating step further comprising modulating the second internally transmitted signal to a select frequency outside of the specified range, said select frequency being different than the frequency of the modulated first internally transmitted signal.

13. The method of claim 12, wherein said modulating step further comprises modulating said first and second internally transmitted signals to a frequency below the minimum frequency value of the fixed frequency band, and wherein said converting step further comprises converting the modulated first and second internally transmitted signals to frequencies greater than the maximum frequency value of the fixed frequency band but within the specified range.

* * * * *